United States Patent

[11] 3,611,382

| [72] | Inventor | Reginald I. Gray |
| | | Fredericksburg, Va. |
| [21] | Appl. No. | 875,607 |
| [22] | Filed | Nov. 12, 1969 |
| [45] | Patented | Oct. 5, 1971 |
| [73] | Assignee | The United States of America as represented by the Secretary of the Navy |

[54] DETECTOR PROBE FOR MEASUREMENT OF HIGH-FREQUENCY ELLIPTICALLY POLARIZED FIELDS
4 Claims, 4 Drawing Figs.

| [52] | U.S. Cl. | 343/100 PE, 325/67, 343/703, 343/743 |
| [51] | Int. Cl. | H01q 15/00 |
| [50] | Field of Search | 343/100 PE, 703, 732, 741, 743; 325/363, 67 |

[56] References Cited
UNITED STATES PATENTS

| 2,641,756 | 6/1953 | Dodington | 343/100 PE |
| 3,296,533 | 1/1967 | Karpinsky | 325/67 X |
| 3,357,021 | 12/1967 | Allen | 343/100 PE |

Primary Examiner—Rodney D. Bennett, Jr.
Assistant Examiner—Richard E. Berger
Attorneys—R. S. Sciascia and Thomas O. Watson, Jr.

ABSTRACT: An electromagnetic probe which is particularly adapted for the measurement of the electric and magnetic vectors of an elliptically polarized field utilizes a hollow shielded loop which has a double load. The loop is mounted in nonmetallic, low perturbation gimbals so that it can take any position in any plane. The loop is rotated through a plurality of angles dictated by the ellipticity at the point at which measurements are taken. Measurements are taken at each required angle. These measurements are then utilized to calculate the intensities of the electric and magnetic vector components of the field.

INVENTOR.
REGINALD I. GRAY
BY Thomas O. Watson Jr.
ATTORNEY

3,611,382

DETECTOR PROBE FOR MEASUREMENT OF HIGH-FREQUENCY ELLIPTICALLY POLARIZED FIELDS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is directed to a probe which is capable of measuring the components of elliptically polarized fields. The probe is particularly adapted for measurement of the near field of an antenna, or of crossed fields, provided they are synchronous and of a single frequency within the bandwidth of the receivers. This invention utilizes the principles studied by Haven Whiteside and discussed in Electromagnetic Field Probes, Report No. 377 Cruft Laboratory, Harvard, Oct. 25, 1962.

In measuring an elliptically polarized field, in general, both E and H are elliptically polarized and must be resolved. Although at present there are some instruments available which detect some form of individual or average field strength of particular components there are no prior art instruments capable of analytically measuring all the components of an elliptically polarized field.

SUMMARY OF THE INVENTION

The present invention represents a substantial improvement over the prior art. The invention resolves the "electric" and "magnetic" vectors of elliptically polarized fields and measures both the magnitude and direction of each component thereof.

The inventive probe utilizes a hollow circular, or other cross section, shielded loop which is mounted in nonmetallic gimbals, to minimize field perturbation. In measuring fields, the loop is rotated through a plurality of angles which are dictated by the field ellipticity at the point of measurement. The loop has two insulated slots, 180° apart, across which load impedances are connected. Tuned RF receivers and associated processing microelectronics are utilized to measure the voltages induced across these slots by the incident field. The instantaneous sum and difference of these two complex voltages are derived electronically by means either of hybrids or of a "balun detector." The common-mode rejection of these devices needs to be at least 30 db, and preferably much higher. Suitable solid-state microelectronic hybrids are available and well known in the art. The electric and magnetic field components are then computed from these outputs using calibrated probe sensitivity constants. Remote indication may be provided if required.

OBJECTS OF THE INVENTION

It is the object of the present invention to provide a new and improved electromagnetic probe for measuring the components of elliptically polarized near and crossed-fields.

It is a further object of the present invention to provide an electromagnetic probe which can measure the electric and magnetic vectors at any point in a synchronous field.

Other objects, advantages and novel features of the present invention will become apparent from the following detailed description of the invention when considered in conjunction with the accompanying drawings.

DESCRIPTION OF THE PREFERRED EMBODIMENTS

Figure 1:
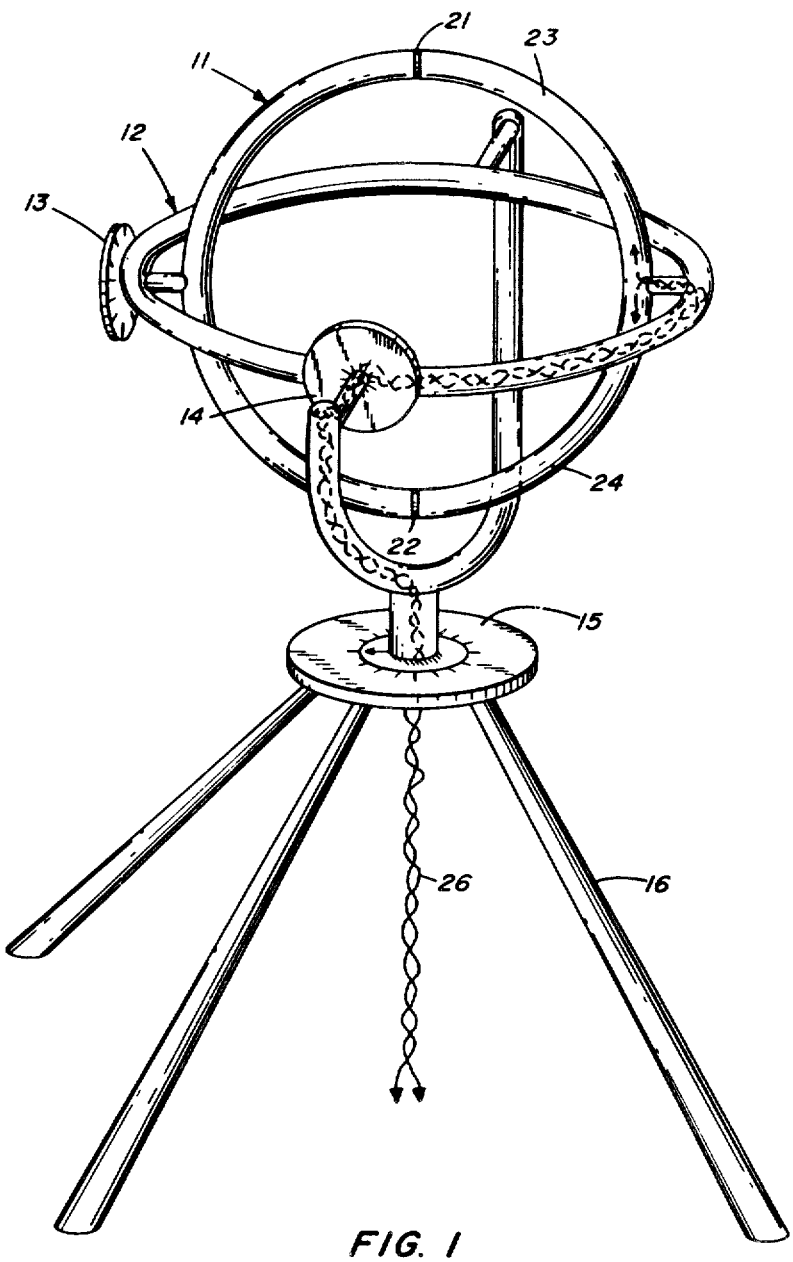
FIG. 1 shows the inventive probe.
Figure 2:
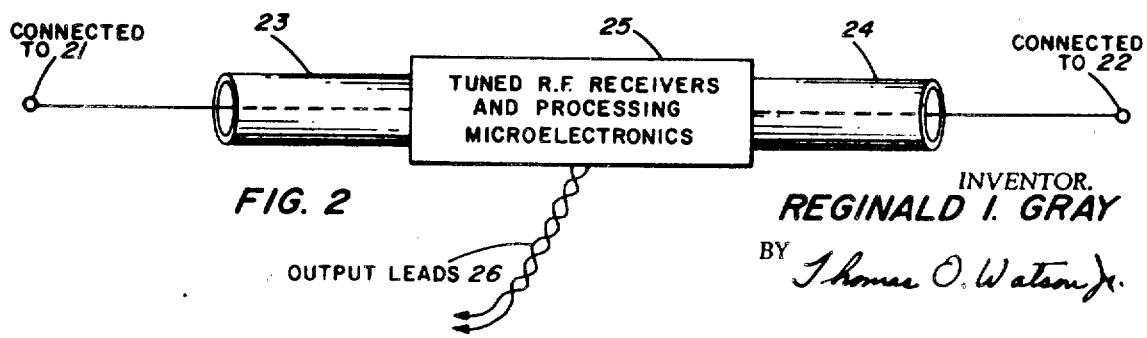
FIG. 2 illustrates the circuitry utilized with the probe. Full technical details of the required sum and differencing are given in the referenced Haven Whiteside Report. However, other well-known sum and differencing circuit designs that perform the same function may be used.

The inventive probe which is shown in FIG. 1 utilizes a circular shielded loop 11, mounted in nonmetallic low perturbation gimbals 12. Nonmetallic scales 13, 14 and 15 are provided for each axis of rotation of the gimbals and pointers are attached to each rotatable axis. The scales are read in degrees of rotation. The gimbals are mounted on a nonmetallic tripod 16. The shield of loop 11 is a thin hollow tube. It is metallic and has two insulated slots 21 and 22 separated by 180°. Each slot has a load resistor and/or coaxial cable connected across it and when the loop is in an electromagnetic field, voltages are set up across these coupling points. These voltages drive currents along two internal coaxial cables 23 and 24 to the receivers and associated signal processing microelectronics 25 as shown in FIG. 2. The circuitry of FIG. 2 is housed inside the loop shield. If required a remote indicator (DC or AF) may be driven via National Bureau of Standards type conducting plastic leads 26.

The operation of the inventive probe relies on the principle that a loop in an electromagnetic field responds to both symmetric and antisymmetric modes of excitation. A loop so excited has a circulating antisymmetric current mode associated with the magnetic field. It also has a dipolar symmetric excitation current mode generated across the diameter of the loop which is associated with the electric field. This well-established principle is discussed by Haven Whiteside in the referenced report. The designation of the electric field as corresponding to the symmetric mode and the magnetic field as corresponding to the antisymmetric mode is traditional but analytically debatable. Both modes are related through Maxwell's equations. In general, using Whiteside's notation:

$$V_{(o)} = V_a + V_s$$
$$V_{(\pi)} = V_a - V_s \text{ for equal load impedances.}$$
$$I_{(o)} = I_a + I_s$$
$$I_{(\pi)} = I_a - I_s$$

where the subscripts $(0)$ $(\pi)$ refer to slot positions 180° apart. It follows that the symmetric (subscript $s$) and the antisymmetric (subscript $a$) components can be obtained by taking half the sum and difference of these complex voltages or currents.

The most general synchronous field is elliptically polarized in both E and H. While this invention can measure any general elliptically polarized field, it is particularly useful in the measurement of the near fields of geometrically linear and loop antennas. The operational discussion which follows is concerned with a linear antenna (electric dipole) but because of the dual nature of Maxwell's equations it can readily be carried over to a magnetic dipole, or loop antenna.

Figure 3:
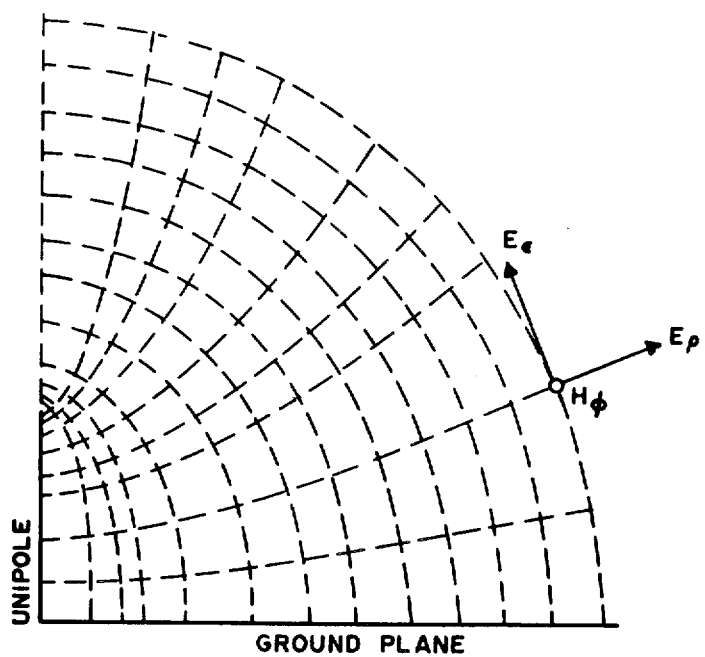
FIG. 3 illustrates one quadrant of the near field of a quarter wave unipole antenna.

The elliptically polarized near field of a geometrically linear antenna can be considered as the resultant of two waves. The first is a radiative wave travelling along the outward normals of the ellipsoidal surfaces and the second is a standing wave along the ellipsoidal surfaces (using confocal—ellipsoidal/hyperboloidal coordinates). The ellipsoidal surfaces are wave front surfaces of constant phase. The electric field is elliptically polarized and the magnetic field is linearly polarized normal to the plane of the ellipse. In the special case of a quarter-wave stub antenna, above a ground plane, for example, the radiation component is described by the in-phase vector/phasors $E_\epsilon$ and $H_\phi$, whereas the standing wave is described by the quadrature vector/phasors $E_p$ and $H_\phi$, as shown in FIG. 3. Therefore, the elliptical components of the electric field are $E_p$ and $E_\epsilon$. In this case there is only one component of H. For this particular simple case, $E_\epsilon$ and $E_p$ are 90° out of phase and are mutually perpendicular in space. In the general case this simple picture no longer holds. As already mentioned, the analysis can go over to that of a magnetic dipole by interchanging the roles of E and H. The inventive probe works equally well in these particular cases in the general cases or arbitrary length antennas having arbitrary configuration. In the latter, both E and H will be elliptically polarized but, providing there is no relative phase shift between elementary impressed currents, or spacial variation in the antenna elements, the related ellipses will be confined to stable planes, but these will be different at different points in the field.

The voltages derived from the magnetic or electric field components, as determined by the inventive probe, are combined with sensitivity constants to yield measures of the field intensities. These constants are determined by the loop geometry and circuit arrangements. Approximate values for these constants may be computed from first principles, as explained in the Whiteside report, but for higher accuracy the probe is calibrated in a known near-field. Generally, this field is provided by a resonant quarter-wave monopole (unipole) antenna mounted above a ground plane. The field of such an ideal antenna is readily computed from the antenna equations. The proportionality constants are then determined by comparing measured and theoretical results, with suitable corrections for image effects.

Figure 4:
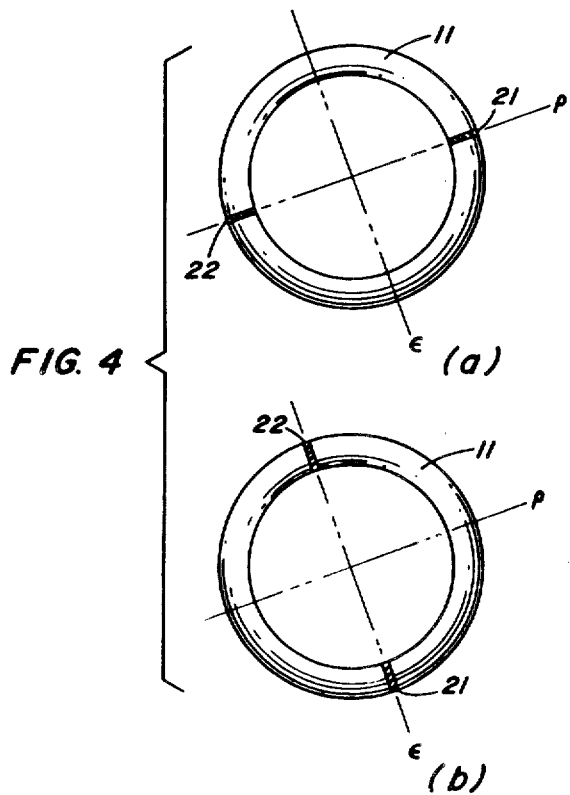
FIG. 4 shows two measuring positions on the probe.

In operation, the probe is centered at the point at which it is desired to measure the components of an elliptically polarized field. For an elliptical E field the circular loop 11 is then positioned so that the plane in which the loop lies is normal to the direction of the magnetic field. The loop is first rotated in its plane to confirm a constant antisymmetric response, the electronics being switched to the antisymmetric (magnetic vector) mode. This is the measure of H. The electronics are then switched to the symmetric (electric vector) mode and this response is maximized by rotating the loop in this same plane until the slots are aligned with the minor axis of the E ellipse as exemplified in FIG. 4 (a). The minor axis component is then measured by rotating the loop through 90°, as in FIG. 4 (b) which should yield a minimum. Any other sets of components may be measured along selected coordinates (for example Cartesian).

THe current flowing through the loads in the loop may be resolved into symmetric and antisymmetric components. As shown in the Whiteside report, the complex sum and difference of the voltages or currents will yield these two components, simply because, by definition, they add in one load and subtract in the other. However, in the general case it is essentially a phasor sum/difference, in which both magnitude and phase are important. This must be done electronically. The three components $E_{max}$, $E_{min}$ and H provide a complete picture of the field at a particular point. The inventive probe yields not only their magnitudes but also their spacial directions.

The procedure for determining the components of the field due to a magnetic dipole (loop antenna) would be different. In this field, H would be elliptically polarized but E would not. In measuring such a field the plane of the loop would be set with its normal in the plane of the elliptical H vector. The loop slots would then be oriented so as to align with the single E vector. This could be tested by switching to the symmetric mode and finding a minimum without changing the plane of the loop. If the loop plane were then rotated about this axis of the slots the H ellipse response would be measured and its maximum and minimum values could be found, under conditions of zero symmetric (E) response.

In any general elliptical field E and H are both elliptically polarized. The plane of the required ellipse is that containing the highest values of both the maximum (major axis) and the minimum (minor axis) responses. This position can be found simply by trial and error if the general structure of the field is entirely unknown. In the vast majority of cases the geometry of the antenna and the necessary boundary conditions at reflecting metallic surfaces give a good indication of where to start the search for such elliptical planes.

The probe can also be used in other fields. In a plane wave (given sufficient receiver sensitivity) the load slots may be aligned with the E vector so as to yield a pure H response. Similarly, the loop plane may be made coincident with the wave front and the slots orientated at right angles to the E vector so that a pure symmetric (E) response is obtained.

Thus, it is seen that a new and improved electromagnetic probe has been provided. The inventive probe provides analytic and complete measurement of all fields including synchronous elliptically polarized fields. Obviously many modifications and variations of the present invention are possible in the light of the above teachings.

What is claimed is:

1. An electromagnetic probe comprising:
   a supporting member; and
   a hollow metallic loop rotatably attached to said support, said loop having two insulated slots separated by 180°; and
   coupling means mounted across each of the slots; and
   measuring means attached to each of said coupling means;
   whereby said measuring means measures the voltages across said coupling means when said loop is placed in an electromagnetic field.

2. An electromagnetic probe as in claim 1 wherein said loop is formed from tubular material.

3. An electromagnetic probe as in claim 2 wherein said support comprises:
   gimbals in which said loop is mounted for movement in three planes; and
   a tripod upon which said gimbals are rotatably mounted.

4. The method of measuring an elliptically polarized electromagnetic field with a circular metallic loop comprising the steps of:
   calibrating the circular metallic loop in a known electromagnetic field to determine the sensitivity proportionality constants for the symmetric and antisymmetric modes;
   placing the loop at the required points of the field to be measured;
   switching the measuring means to either symmetric or antisymmetric mode;
   rotating the loop in three dimensions so as to find the plane in which the highest values of both maximum and minimum responses occur;
   measuring the maximum and minimum voltages in the elliptical plane thus defined;
   repeating the above procedure for nonchosen mode of step 3; and
   computing the magnitudes of both E and H elliptical components by means of calibrated probe sensitivity constants.